United States Patent
Wan

(10) Patent No.: US 11,204,537 B2
(45) Date of Patent: Dec. 21, 2021

(54) LENS MODULE

(71) Applicant: AAC Technologies Pte. Ltd., Singapore (SG)

(72) Inventor: Jia Wan, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 260 days.

(21) Appl. No.: 16/525,593

(22) Filed: Jul. 30, 2019

(65) Prior Publication Data

US 2020/0041871 A1 Feb. 6, 2020

(30) Foreign Application Priority Data

Aug. 3, 2018 (CN) .......................... 201821245240.8

(51) Int. Cl.
  *G03B 11/04* (2021.01)
  *G03B 17/12* (2021.01)
  *G02B 7/02* (2021.01)

(52) U.S. Cl.
  CPC ............ *G03B 11/045* (2013.01); *G02B 7/021* (2013.01); *G02B 7/022* (2013.01); *G03B 17/12* (2013.01)

(58) Field of Classification Search
  CPC ...... G03B 11/045; G03B 7/021; G03B 7/022; G03B 17/12
  USPC .......................................................... 359/819
  See application file for complete search history.

(56) References Cited

U.S. PATENT DOCUMENTS

| | | | | |
|---|---|---|---|---|
| 2011/0286120 A1* | 11/2011 | Harris | ..................... | G02B 7/022 359/827 |
| 2015/0219871 A1* | 8/2015 | Kim | ....................... | G02B 7/021 359/793 |

\* cited by examiner

*Primary Examiner* — Collin X Beatty
(74) *Attorney, Agent, or Firm* — W&G Law Group

(57) ABSTRACT

Provided is a lens module, including a lens barrel, a set of lenses and a light-blocking member. The set of lenses includes a first lens disposed adjacent to the light-blocking member. The first lens includes a first optical portion for imaging and a first fixing portion surrounding the first optical portion. The lens module further includes a first positioning structure configured to fix the first lens to the light-blocking member. The first positioning structure includes a first positioning part arranged on one of the first fixing portion and the light-blocking member, and a first holding part arranged in the other one of the first fixing portion and the light-blocking member; the first holding part holds the first positioning part. The lens module according to the present disclosure has an improved stability and reliability of fixation between the lens and the light-blocking member.

7 Claims, 3 Drawing Sheets

LENS MODULE

TECHNICAL FIELD

The present disclosure relates to the technical field of optical imaging technologies, and in particular, to a lens module.

BACKGROUND

With development of technologies, electronic devices are becoming more and more intelligent. In addition to digital cameras, portable electronic devices such as tablets and cellphones are also equipped with a lens module having a camera function in order to meet the user's requirements for instant photographing. As the technology progresses, the user's requirements on imaging quality of the lens module are becoming higher and higher. The lens module known in the related art usually includes two parts, i.e., a lens barrel and a set of lenses arranged in the lens barrel. A light-blocking member is provided between lenses.

The inventors have found that the imaging quality of the overall lens module is directly affected by the stability and reliability of fixation between the lens and the light-blocking member. However, in the lens module in the related art, the lens is generally fixed to the light-blocking member by pressing, and with such fixing manner, the lens and the light-blocking member are likely to move with respect to each other, resulting in a poor stability and reliability of fixation between the lens and the light-blocking member.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
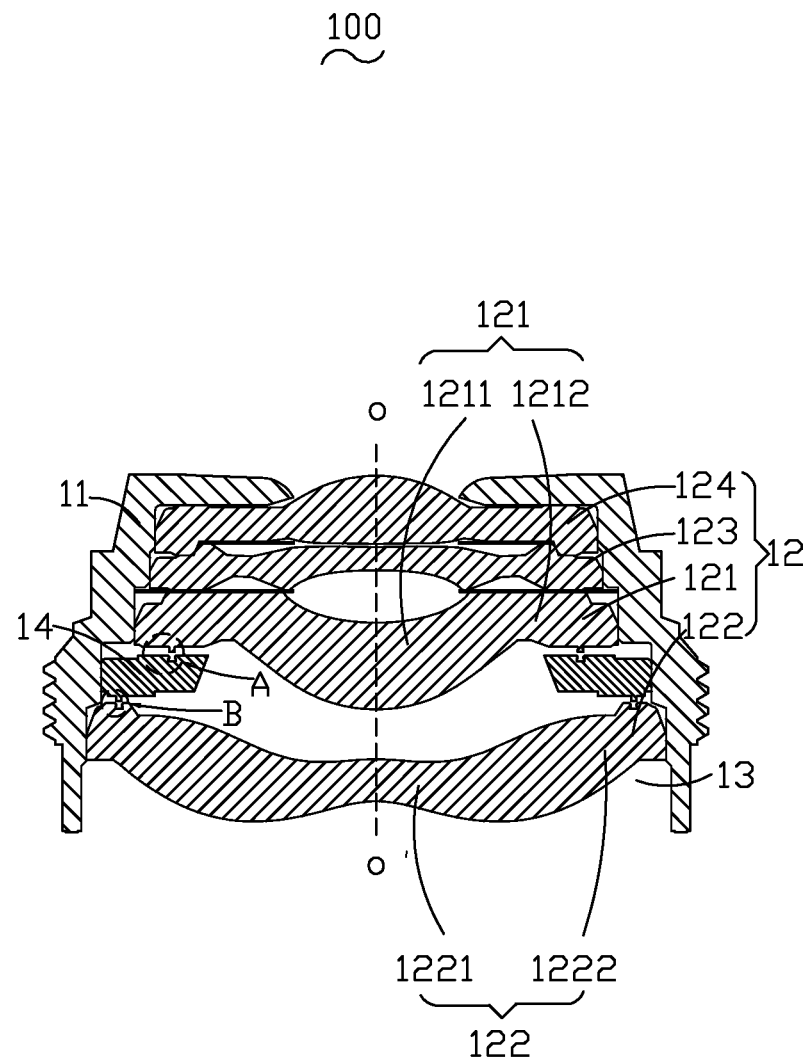
FIG. 1 is a structural schematic cross-sectional view of a lens module according to a first embodiment of the present disclosure.
Figure 2:
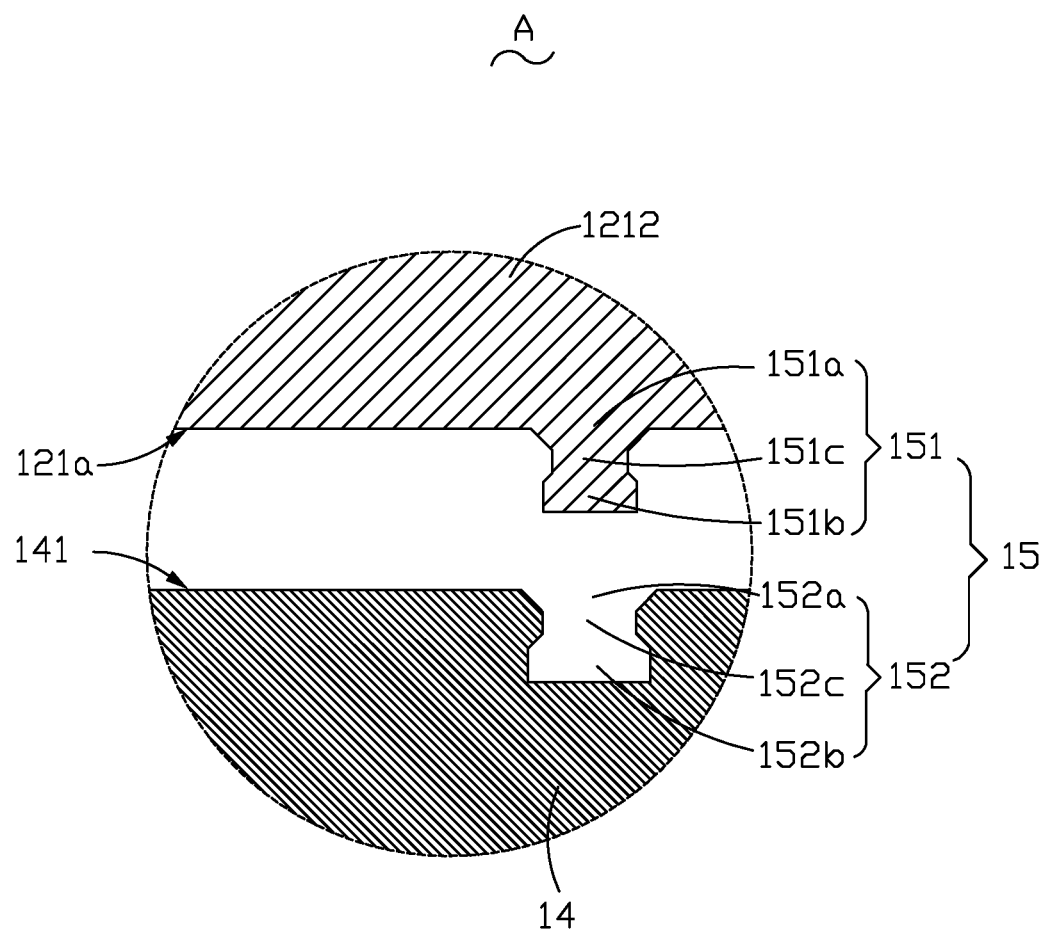
FIG. 2 is an enlarged view of an area A of FIG. 1.
Figure 3:
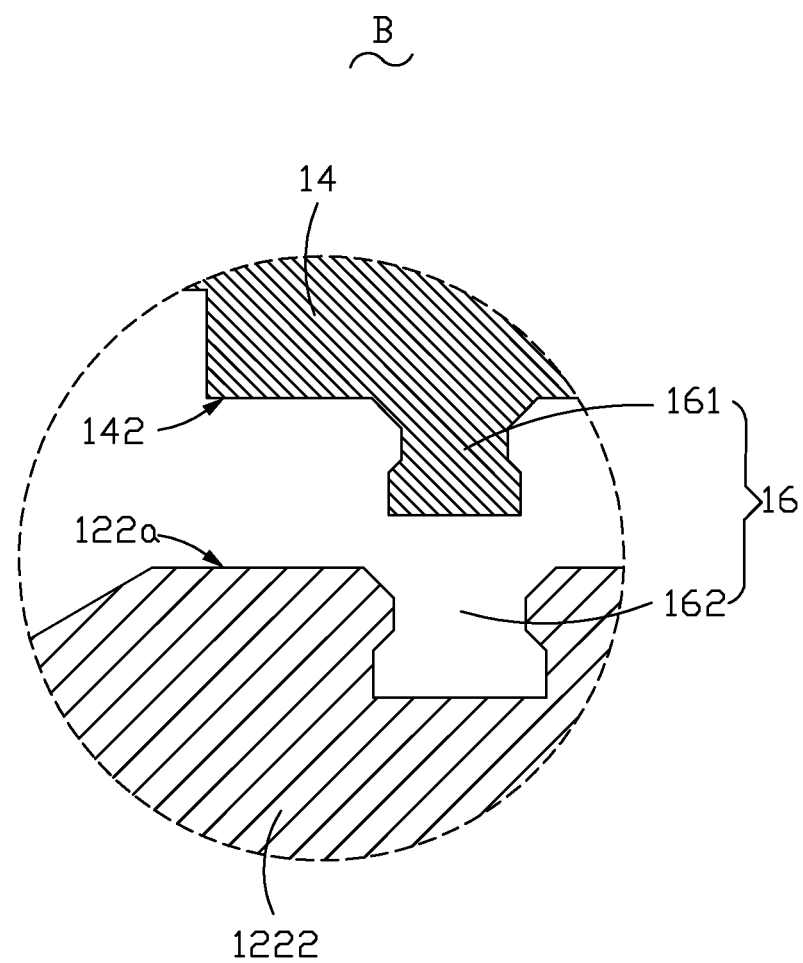
FIG. 3 is an enlarged view of an area B of FIG. 1.

A first embodiment of the present disclosure provides a lens module 100. As shown in FIG. 1 and FIG. 2, the lens module 100 includes a lens barrel 11 and a set of lenses 12. The lens barrel 11 has a receiving space 13, in which the set of lenses 12 is received. The set of lenses 12 includes a first lens 121. A light-blocking member 14 is arranged at an image side of the first lens 121 and adjacent to the first lens 121. The first lens 121 includes a first optical portion 1211 for imaging and a first fixing portion 1212 surrounding the first optical portion 1211. The lens module 100 further includes a first positioning structure 15 configured to fix the first lens 121 to the light-blocking member 14. The first positioning structure 15 includes a first positioning part 151, and a first holding part 152 configured to fixedly hold the first positioning part 151. The first positioning part 151 is arranged on one of the first fixing portion 1212 and the light-blocking member 14, and the first holding part 152 is arranged on the other one of the first fixing portion 1212 and the light-blocking member 14.

Compared with the prior art, in the first embodiment of the present disclosure, the lens module 100 is provided with the first positioning structure 15, in which the first positioning part 151 is fixedly held by the first holding part 152. Since the first positioning part 151 and the first holding part 152 are respectively arranged on the first lens 121 and the light-blocking member 14, the first holding part 152 fixes the first lens 121 to the light-blocking member 14 while holding the first positioning part 151. Due to a holding effect of the first holding part 152 on the first positioning part 151, both stability and reliability of fixation between the first lens 121 and the light-blocking member 14 are improved.

Specifically, in this embodiment, the first fixing portion 1212 includes a first surface 121a close to the light-blocking member 14, and the light-blocking member 14 includes a first light-blocking surface 141 disposed opposite to the first surface 121a. The first positioning part 151 is arranged on one of the first surface 121a and the first light-blocking surface 141, and the first holding part 152 is arranged on the other one of the first surface 121a and the first light-blocking surface 141.

Further, in this embodiment, the first positioning part 151 is a protrusion, and the first holding part 152 is a groove configured to match the protrusion. The so-called match herein means that the protrusion and the groove have a same shape and a same size, and the protrusion can be fitted in and stably locked in the groove, so that the first holding part 152 and the first positioning part 151 are relatively fixed. By means of simple structures such as the protrusion and the groove, the first holding part 152 can fixedly hold the first positioning part 151, and these structures are relatively simple and thus can be easily manufactured.

Further, in this embodiment, the first positioning part 151 (i.e., the protrusion) is arranged on the first fixing portion 1212. The first positioning part 151 includes a connecting portion 151a connected to the first fixing portion 1212, a lock-in portion 151b located at an end of the connecting portion 151a facing away from the first lens 121, and a middle portion 151c connecting the lock-in portion 151b with the connecting portion 151a. A width of the lock-in portion 151b in a direction perpendicular to an optical axis OO' of the lens module 100 is larger than a width of the middle portion 151c in the direction perpendicular to the optical axis OO' of the lens module 100.

In addition, in this embodiment, the first positioning part 151 is arranged on the first fixing portion 1212, and the first holding part 152 is arranged in the light-blocking member 14. The first holding part 152 (i.e., the groove) includes an groove opening portion 152a close to a surface of the light-blocking member 14, a groove bottom portion 152b disposed at an end of the groove opening portion 152a facing away from the surface of the light-blocking member 14, and a groove middle portion 152c connecting the groove opening portion 152a with the groove bottom portion 152b. The lock-in portion 151b is received in the groove bottom portion 152b, the connecting portion 151a is received in the groove opening portion 152a, and the middle portion 151c is received in the groove middle portion 152c. In the direction perpendicular to the optical axis OO', the groove bottom portion 152b and the lock-in portion 151b have a larger width than the groove middle portion 152c. The lock-in portion 151b is received in the groove bottom portion 152b, the connecting portion 151a is received in the groove opening portion 152a, and the middle portion 151c is received in the groove middle portion 152c. The groove bottom portion 152b and the lock-in portion 151b has a greater width than the groove middle portion 152c, so that the first holding part 152 can fixedly hold the first positioning part 151 also in the direction perpendicular to the optical axis OO', thereby preventing the first lens 121 and the light-blocking member 14 from relatively moving in the direction along the optical axis OO'. In this way, the stability and reliability of fixation between the first lens 121 and the light-blocking member 14 can be further improved.

It should be understood that the present embodiment merely illustrates an exemplary position arrangement manner of the first positioning part 151 and the first holding part 152, in which the first positioning part 151 is arranged on the first fixing portion 1212 and the first holding part 152 is arranged in the light-blocking member 14. In other embodiments of the present disclosure, it is also possible that the first holding part 152 is arranged in the first fixing portion 1212 and the first positioning part 151 is arranged on the light-blocking member 14, and the same technical effect can still be achieved without changing the specific structure of the first holding part 152 and the first positioning part 151. In the actual manufacturing process, the position arrangement manner of the first positioning part 151 and the first holding part 152 can be selected according to actual needs.

In this embodiment, the set of lenses 12 further includes a second lens 122. It should be understood that the set of lenses 12 may also include other lenses, such as a lens 123, a lens 124 as shown in FIG. 1. The second lens 122 and the first lens 121 are respectively located at two sides of the light-blocking member 14. In this embodiment, the first lens 121 is located at an object side of the light-blocking member 14, and the second lens 122 is located at an image side of the light-blocking member 14. It should be noted that, in other embodiments of the present disclosure, the first lens 121 can also be located at the image side of the light-blocking member 14, and the second lens 122 can located at the object side of the light-blocking member 14. The second lens 122 includes a second optical portion 1221 for imaging and a second fixing portion 1222 surrounding the second optical portion 1221. The lens module 100 further includes a second positioning structure 16 configured to fix the second lens 122 to the light-blocking member 14. The second positioning structure 16 includes a second positioning part 161, and a second holding part 162 configured to fixedly hold the second positioning part 161. The second positioning part 161 is arranged on one of the second fixing portion 1222 and the light-blocking member 14, and the second holding part 162 is arranged in the other one of the second fixing portion 1222 and the light-blocking member 14. Due to a holding effect of the first holding part 162 on the first positioning part 161, the stability and reliability of fixation between the second lens 122 and the light-blocking member 14 are improved.

Specifically, in this embodiment, the second fixing portion 1222 includes a second surface 122a close to the light-blocking member 14, and the light-blocking member 14 includes a second light-blocking surface 142 disposed opposite to the second surface 122a. The second positioning part 161 is arranged on one of the second surface 122a and the second light-blocking surface 142, and the second holding part 162 is arranged on the other one of the second surface 122a and the second light-blocking surface 142.

Further, in this embodiment, the second positioning part 161 is a protrusion, and the second holding part 162 is a groove configured to match the protrusion. The so-called match herein means that the protrusion and the groove have a same shape and a same size, and the protrusion can be fitted in and stably locked in the groove, so that the second holding part 162 and the second positioning part 161 are relatively fixed. By means of simple structures such as the protrusion and the groove, the second holding part 162 can fixedly hold the second positioning part 161, and these structures are relatively simple and thus can be easily manufactured.

It should be noted that, in the actual production process, the absolute parallel or perpendicular structure is impossible due to the inevitable existence of errors. Therefore, the definition terms such as "parallel" and "perpendicular" mentioned in the embodiments also indicate approximately parallel or approximately perpendicular as long as achieving the technical effect of the present disclosure.

It should be understood by those skilled in the art that the above embodiments are merely some specific embodiments of the present disclosure, and various changes in form and details may be made without departing from the scope of the present disclosure.

What is claimed is:

1. A lens module, comprising:
   a lens barrel having a receiving space;
   a set of lenses received in the receiving space;
   a light-blocking member; and
   a first positioning structure,
   wherein the set of lenses comprises a first lens adjacent to the light-blocking member,
   the first lens comprises a first optical portion for imaging and a first fixing portion surrounding the first optical portion,
   the first positioning structure is configured to fix the first lens to the light-blocking member, and
   the first positioning structure comprises a first positioning part arranged on one of the first fixing portion and the light-blocking member, and a first holding part arranged on the other one of the first fixing portion and the light-blocking member, the first holding part being configured to fixedly hold the first positioning part,
   the first positioning part is a protrusion, and the first holding part is a groove configured to match the protrusion,
   the protrusion is arranged on the first fixing portion, the protrusion comprises a connecting portion connected to the first fixing portion, a lock-in portion located at an end of the connecting portion facing away from the first fixing portion, and a middle portion connecting the connecting portion with the lock-in portion, in a direction perpendicular to an optical axis of the lens module, the lock-in portion has a greater width than the middle portion.

2. The lens module as described in claim 1, wherein the groove comprises an groove opening portion close to a surface of the light-blocking member, a groove bottom portion located at an end of the groove opening portion facing away from the surface of the light-blocking member, and a groove middle portion connecting the groove opening portion with the groove bottom portion,
   the lock-in portion is received in the groove bottom portion, the connecting portion is received in the groove opening portion, and the middle portion is received in the groove middle portion,
   in the direction perpendicular to the optical axis of the lens module, the groove bottom portion and the lock-in portion each have a greater width than the groove middle portion.

3. The lens module as described in claim 1, further comprising a second positioning structure,
   wherein the set of lenses further comprises a second lens, the second lens and the first lens being located on two sides of the light-blocking member, respectively,
   the second lens comprises a second optical portion for imaging and a second fixing portion surrounding the second optical portion,
   the second positioning structure is configured to fix the second lens to the light-blocking member, and the second positioning structure comprises a second positioning part arranged on one of the second fixing portion and the light-blocking member, and a second holding part arranged on the other one of the second fixing portion and the light-blocking member, the second holding part being configured to fixedly hold the second positioning part.

4. The lens module as described in claim 3, wherein the second fixing portion comprises a second surface close to the light-blocking member, and the light-blocking member comprises a second light-blocking surface disposed opposite to the second surface,
   the second positioning part is arranged on one of the second light-blocking surface and the second surface, and the second holding part is arranged on the other one of the second light-blocking surface and the second surface.

5. The lens module as described in claim 3, wherein the second positioning part is a protrusion, and the second holding part is configured to match and be fixed to the protrusion.

6. A lens module, comprising:
   a lens barrel having a receiving space;
   a set of lenses received in the receiving space;
   a light-blocking member; and
   a first positioning structure,
   wherein the set of lenses comprises a first lens adjacent to the light-blocking member,
   the first lens comprises first optical portion for imaging and a first fixing portion surrounding the first optical portion,
   the first positioning structure is configured to fix the first lens to the light-blocking member, and
   the first positioning structure comprises a first positioning part arranged on one of the first fixing portion and the light-blocking member, and a first holding part arranged on the other of the first fixing portion and the light-blocking member, the first holding part being configured to fixedly hold the first positioning part,
   the first positioning part is a protrusion, and the first holding part is a groove configured to match the protrusion,
   the protrusion is arranged on the light-blocking member, and the protrusion comprises a connecting portion connected to the light-blocking member, a lock-in portion located at an end of the connecting portion facing away from the light-blocking member, and a middle portion connecting the connecting portion with the lock-in portion,
   in a direction perpendicular to an optical axis of the lens module, the lock-in portion has a greater width than the middle portion.

7. The lens module as described in claim 6, wherein the groove comprises an groove opening portion close to a surface of the first fixing portion, a groove bottom portion located at an end of the groove opening portion facing away from the surface of the first fixing portion, and a groove middle portion connecting the groove opening portion with the groove bottom portion,
   the lock-in portion is received in the groove bottom portion, the connecting portion is received in the groove opening portion, and the middle portion is received in the groove middle portion,
   in the direction perpendicular to the optical axis of the lens module, the groove bottom portion and the lock-in portion each have a greater width than the groove middle portion.

* * * * *